United States Patent
Murray

(10) Patent No.: US 9,401,606 B2
(45) Date of Patent: Jul. 26, 2016

(54) SYSTEM AND METHOD FOR PROVIDING ACTIVE POWER BALANCING

(75) Inventor: Aengus Murray, Manhattan Beach, CA (US)

(73) Assignee: Infineon Technologies Americas Corp., El Segundo, CA (US)

( * ) Notice: Subject to any disclaimer, the term of this patent is extended or adjusted under 35 U.S.C. 154(b) by 819 days.

(21) Appl. No.: 13/279,550

(22) Filed: Oct. 24, 2011

(65) Prior Publication Data

US 2013/0099579 A1 Apr. 25, 2013

(51) Int. Cl.
*H02J 1/00* (2006.01)
*H02J 3/00* (2006.01)
*H02J 7/00* (2006.01)

(52) U.S. Cl.
CPC ............. *H02J 7/0018* (2013.01); *H02J 7/0016* (2013.01); *Y02T 10/7055* (2013.01); *Y10T 307/707* (2015.04)

(58) Field of Classification Search
CPC .......................................................... H02J 1/00
USPC .......................................................... 307/86
See application file for complete search history.

(56) References Cited

U.S. PATENT DOCUMENTS

| 7,965,061 | B2 * | 6/2011 | Li et al. ......................... 320/152 |
| 8,242,745 | B2 * | 8/2012 | Zhang et al. .................. 320/119 |
| 2004/0246635 | A1 * | 12/2004 | Morita ............................ 361/1 |
| 2006/0220463 | A1 * | 10/2006 | Patel et al. ...................... 307/60 |
| 2010/0194361 | A1 * | 8/2010 | Hardman et al. ............. 323/282 |
| 2012/0228931 | A1 * | 9/2012 | Butzmann ................... 307/10.1 |

* cited by examiner

*Primary Examiner* — Toan Vu
(74) *Attorney, Agent, or Firm* — Farjami & Farjami LLP

(57) ABSTRACT

According to one embodiment, a system for actively balancing power between several power units is disclosed. Each of the power units includes a corresponding group of cascoded energy cells. The system for actively balancing power comprises a group of buck/boost circuits used in each of the power units for maintaining an internal power balance among the corresponding group of cascoded energy cells, and an energy distribution circuit for responding to a respective energy need in each of the power units. The energy distribution circuit is configured to transfer energy between the power units to balance power among the power units according to their respective energy needs. In one embodiment, a method for actively balancing power between several power units comprises maintaining the internal power balance among the group of cascoded energy cells within each of the power units, and transferring energy between the power units as needed.

19 Claims, 5 Drawing Sheets

SYSTEM AND METHOD FOR PROVIDING ACTIVE POWER BALANCING

BACKGROUND OF THE INVENTION

1. Field of the Invention

The present invention is generally in the field of electrical circuits and systems. More specifically, the present invention is in the field of power management circuits and systems.

2. Background Art

The storage and on-demand delivery of electrical energy is becoming increasing important as the shift from fossil fuel based technologies to green technologies gains momentum. Gas/electric hybrid automobiles, for example, typically utilize arrays of secondary batteries that are alternately charged and discharged in response to vehicular operation. Those secondary battery packs may constitute a substantial portion of the cost of a gas/electric hybrid vehicle, and their performance, and in particular their longevity, may significantly influence consumer willingness to invest in the initially costlier vehicle purchase price.

Typical energy storage packs are assembled from individual batteries or energy cells and each energy cell unit is often assumed or selected to be nominally identical. In practice, the batteries or other energy cells will have individual performance parameters, such as storage capacity and/or resistance, that vary somewhat from energy cell to energy cell. The distribution or variation among energy cells may arise, for example, from process variation at the time of manufacturing, from unequal wear during use cycles, and through other non-use related degradation of the energy cells. In general, the distribution of the variations is often seen to grow wider as the energy cells grow older. Unfortunately, the longevity and capacity of a group of energy cells used collectively, such as a battery pack, is typically determined by the weakest energy cell or battery in the group.

Conventional approaches to providing management of energy cell performance tend to focus on balancing one aspect of the energy cells at a particular time, for example, when a battery pack is not in use, or near the end of a charge or discharge cycle. At that time, for example, the stronger cells may be drained down to the state of charge (SOC) of the weakest cell. In other implementations, circuitry may be provided to transfer charge from one cell to an adjacent cell until energy cell balance is achieved. A significant challenge faced by existing balancing approaches is the increasingly high voltages supplied by the battery packs utilized in industrial and automotive applications. Even when active balancing is attempted, for example, the components used in the balancing circuitry must typically tolerate the full bus voltage of the battery pack, rendering those active balancing solutions costly to implement.

Thus, there is a need to overcome the drawbacks and deficiencies in the art by providing a cost effective active power balancing solution capable of maintaining charge balance during dynamic operation.

SUMMARY OF THE INVENTION

The present application is directed to system and method for providing active power balancing, substantially as shown in and/or described in connection with at least one of the figures, and as set forth more completely in the claims.

DETAILED DESCRIPTION OF THE INVENTION

Figure 1:
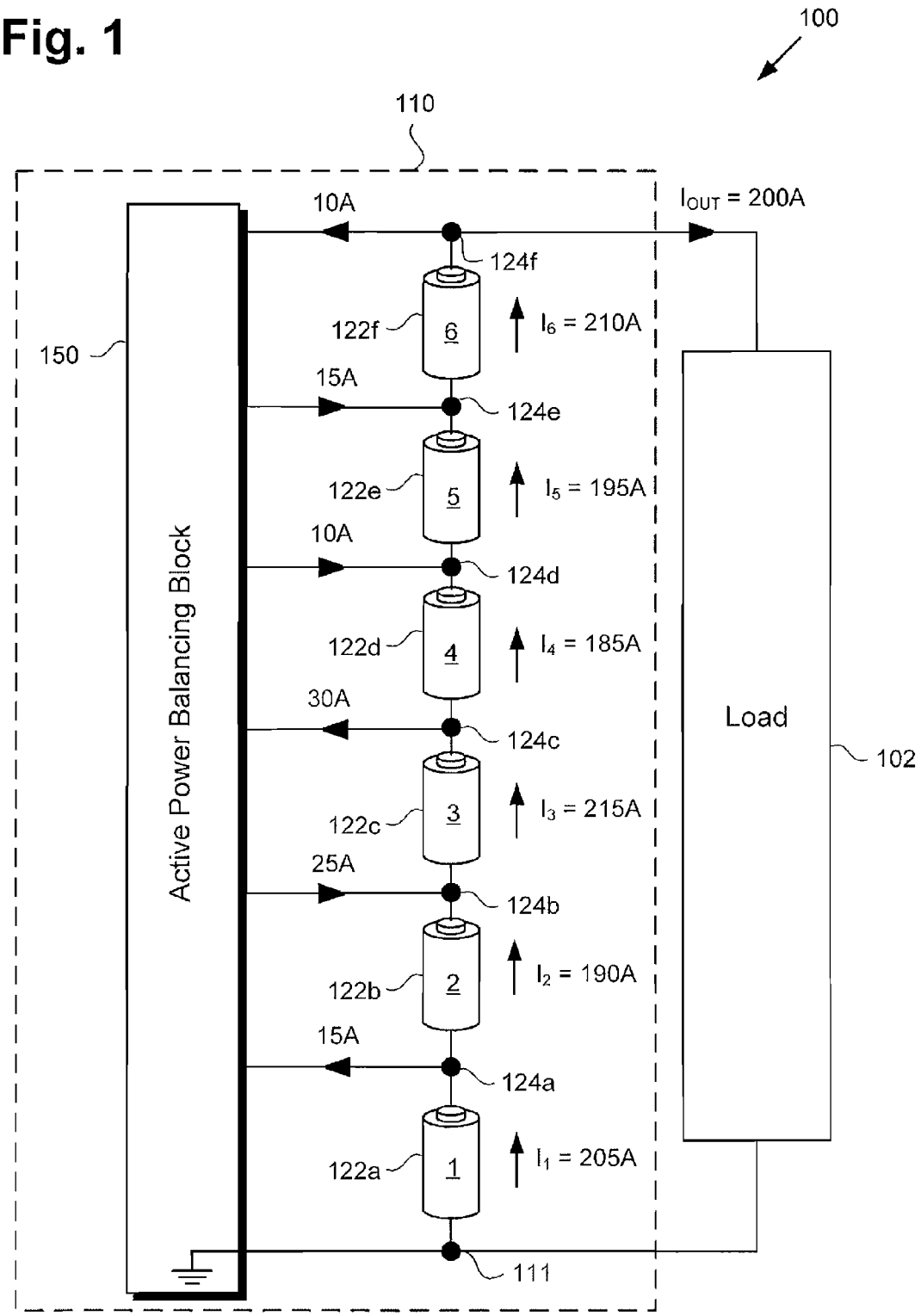
FIG. 1 shows a block diagram depicting an exemplary battery discharge process using a system for providing active power balancing, according to one embodiment of the present invention.

The present invention is directed to system and method for providing active power balancing. Although the invention is described with respect to specific embodiments, the principles of the invention, as defined by the claims appended herein, can obviously be applied beyond the specifically described embodiments of the invention described herein. Moreover, in the description of the present invention, certain details have been left out in order to not obscure the inventive aspects of the invention. The details left out are within the knowledge of a person of ordinary skill in the art.

The drawings in the present application and their accompanying detailed description are directed to merely example embodiments of the invention. To maintain brevity, other embodiments of the invention, which use the principles of the present invention, are not specifically described in the present application and are not specifically illustrated by the present drawings. It should be borne in mind that, unless noted otherwise, like or corresponding elements among the figures may be indicated by like or corresponding reference numerals. Moreover, the drawings and illustrations in the present application are generally not to scale, and are not intended to correspond to actual relative dimensions. In addition, it is noted that, as used herein, the term "cascoded" is interchangeable with and is to be interpreted to have the same meaning as the term "cascaded" known in the art.

FIG. 1 shows a block diagram depicting an example battery discharge process using system 110 for providing active power balancing, according to one embodiment of the present invention. Power environment 100 in FIG. 1 includes system 110 delivering load current $I_{OUT}$ as an output to drive load 102. As shown in FIG. 1, system 110 is implemented as a buck/boost array including common ground node 111 and power transfer nodes 124a, 124b, 124c, 124d, 124e, and 124f (hereinafter "power transfer nodes 124a-124f"). In addition, system 110 includes cascoded energy cells 122a, 122b, 122c, 122d, 122e, and 122f (hereinafter "energy cells 122a-122f"), represented as batteries in FIG. 1. As indicated in FIG. 1, according to the present embodiment, energy cell 122a is connected between ground node 111 and power transfer node 124a, energy cell 122b is connected between power transfer nodes 124a and 124b, energy cell 122c is connected between power transfer nodes 124b and 124c, and so forth.

Also shown in FIG. 1 is load 102, which in the present embodiment draws current $I_{OUT}$ from cascoded energy cells 122a-122f during an energy discharge process. Alternatively, system 110 may be implemented to provide active power balancing during an energy accumulation process by cascoded energy cells 122a-122f. In those embodiments, for example, load 102 may be replaced by a generator configured to operate as a charging source for cascoded energy cells 122a-122f.

By way of perspective, in one embodiment, active power balancing system 110 may be implemented using nominally identical secondary batteries as energy cells 122a-122f. For example, each of energy cells 122a-122f may comprise rechargeable (i.e., secondary) lithium-ion batteries providing approximately 3.5 volts per cell. System 110 can be configured to provide active power balancing for cascoded energy cells 122a-122f during discharge or even heavy discharge of energy cells 122a-122f through load 102, using active power balancing block 150.

It is noted that although the various specific embodiments presented herein will represent energy cells such as energy cells 122a-122f as secondary batteries, for the purposes of illustrating the present inventive concepts, that characterization should not be interpreted as limiting. For instance, system 110 may include more, or fewer, energy cells than the six energy cells shown in FIG. 1. Moreover, although energy cells 122a-122f are characterized as secondary batteries capable of being charged as well as discharged, in one embodiment, energy cells 122a-122f may comprise primary batteries. Furthermore, in other embodiments, energy cells 122a-122f can comprise any suitable charge storage devices, such as a rechargeable automotive batteries, supercapacitors, or photovoltaic cells or panels, for example.

As a specific example of active power balancing, FIG. 1 shows an embodiment of the present invention in which supplemental currents are provided by system 110 so as to enable energy cells 122a-122f to discharge at a balanced, substantially uniform, state of charge (SOC), while concurrently providing the consistent output current needed to drive load 102. As may be seen from FIG. 1, load 102 draws a 200A load current from energy cells 122a-122f of system 110. However, due to individual variations among the energy cells, the energy cells operate at optimal balance when providing the individualized discharge currents shown as $I_1, I_2, I_3, I_4, I_5$, and $I_6$. Accordingly, system 110 implements active power balancing block 150 to effectively transfer energy from the stronger energy cells to the weaker energy cells to compensate for the differences in energy cell strength among cascoded energy cells 122a-122f.

Thus, as shown in FIG. 1, the difference in strength between energy cells 122a and 122b causes system 110 to sink 15A through power transfer node 124a. By contrast, the relative strengths of energy cells 122b and 122c cause system 110 to insert 25A into the stack formed by energy cells 122a-122f through power transfer node 124b. Analogously, the relative adjacent cell strengths at power transfer nodes 124c, 124d, 124e, and 124f determines the amount of current inserted into or sunk through those power transfer nodes by active power balancing block 150. Moreover, the active power balancing approach implemented by system 110 provides supplemental currents selected to achieve and maintain a balanced SOC operation amongst cascoded energy cells 122a-122f. Under those conditions, during discharge, substantially all of energy cells 122a-122f reach a maximum discharge point at substantially the same time. Analogously, during charging, substantially all of energy cells 122a-122f will reach the maximum charge point at substantially the same time.

Figure 2:
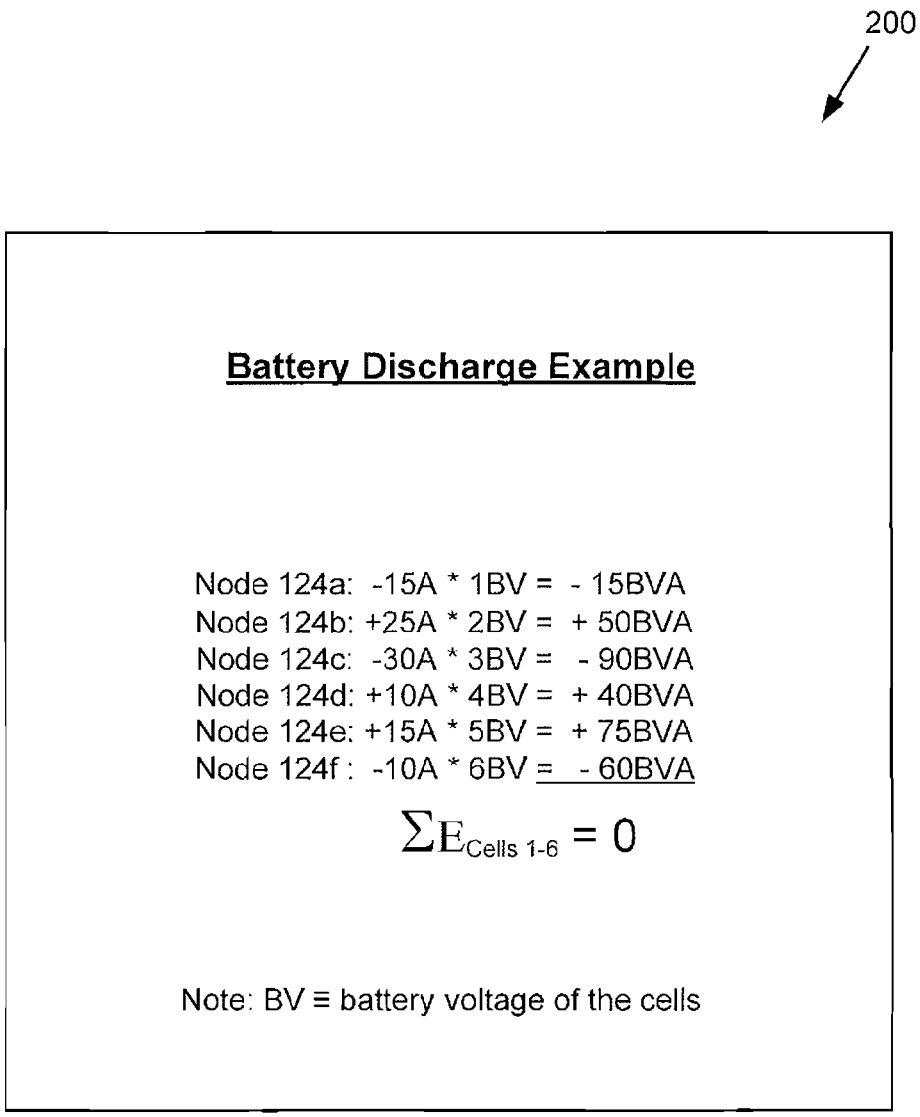
FIG. 2 is a table summarizing the inputs to and outputs from an active power balancing block during an exemplary battery discharge process corresponding to FIG. 1.

FIG. 2 is a table summarizing the inputs to and outputs from an energy cell stack during a battery discharge example corresponding to that shown in FIG. 1. As previously explained, the active power balancing approach implemented by system 110 enables discharge of cascoded energy cells 122a-122f at a substantially uniform SOC, and calibrates the discharge rates for the individual energy cells to meet the average discharge rate for the group, e.g., the load current $I_{OUT}$. Moreover, because energy cells 122a-122f are nominally identical, their individual performance variances from average values are statistically likely to be symmetrically distributed about those averages. Consequently, the present approach results in the sum of all energy supplements and energy reductions mediated by active power balancing block 150 to substantially equal zero, or at least to approach that value.

That is to say, with the exception of internal losses due to operation of system 110, which may be expected to be small, energy is substantially conserved in the process of adjusting the discharge rates at each of power transfer nodes 124a-124f. As shown by table 200 in FIG. 2, the sum of the energy supplied to or sunk through each of power transfer nodes 124a-124f during discharge of energy cells 122a-122f at a substantially uniform SOC sums to zero.

However, careful examination of FIG. 2 suggests a potential drawback of the particular implementation represented by the entries in table 200. When an active power balancing block is configured so as to include a common power bus, the power delivered by or sunk to active power balancing block 150, in FIG. 1, grows higher for a given current as progress is made up the stack of cascoded energy cells 122a-122f. For example, passage of 10A of current through power transfer node 124a would result in 10 battery voltage-amperes (BVA) of power being transferred through power transfer node 124a, while passage of the same 10A of current through power transfer node 124f results in 60 BV of transferred power. Moreover, in order to drive current into power transfer node 124f in the event that were required for active balancing, the voltage supplied by a common power bus, if such a design were implemented in active power balancing block 150, would have to exceed the additive voltages of energy cells 122a-122f, i.e., the stack voltage.

In applications using a stack of relatively few energy cells, such as the six energy cells shown in FIG. 1, or those in which the stack voltage is relatively low for other reasons, use of an active power balancing system implemented with a common power bus may be advantageous due to its simplicity. However, when large stacks of energy cells representing correspondingly large voltages are contemplated, a common power bus implementation may place substantial stress on the circuit elements, e.g., active and passive elements, used to effectuate active power balancing. For example, in a typical hybrid automotive application, a rechargeable battery pack may comprise one hundred energy cells in series, each providing approximately 3.5V. A common power bus implementation under those circumstances would require that the circuitry internal to active power balancing block 150 be able tolerate voltages of greater than 350V, such as 500V, for example. Because requiring use of such rugged components is costly, a common power bus implementation of active power balancing block 150 may prove substantially undesirable for such applications.

Figure 3:
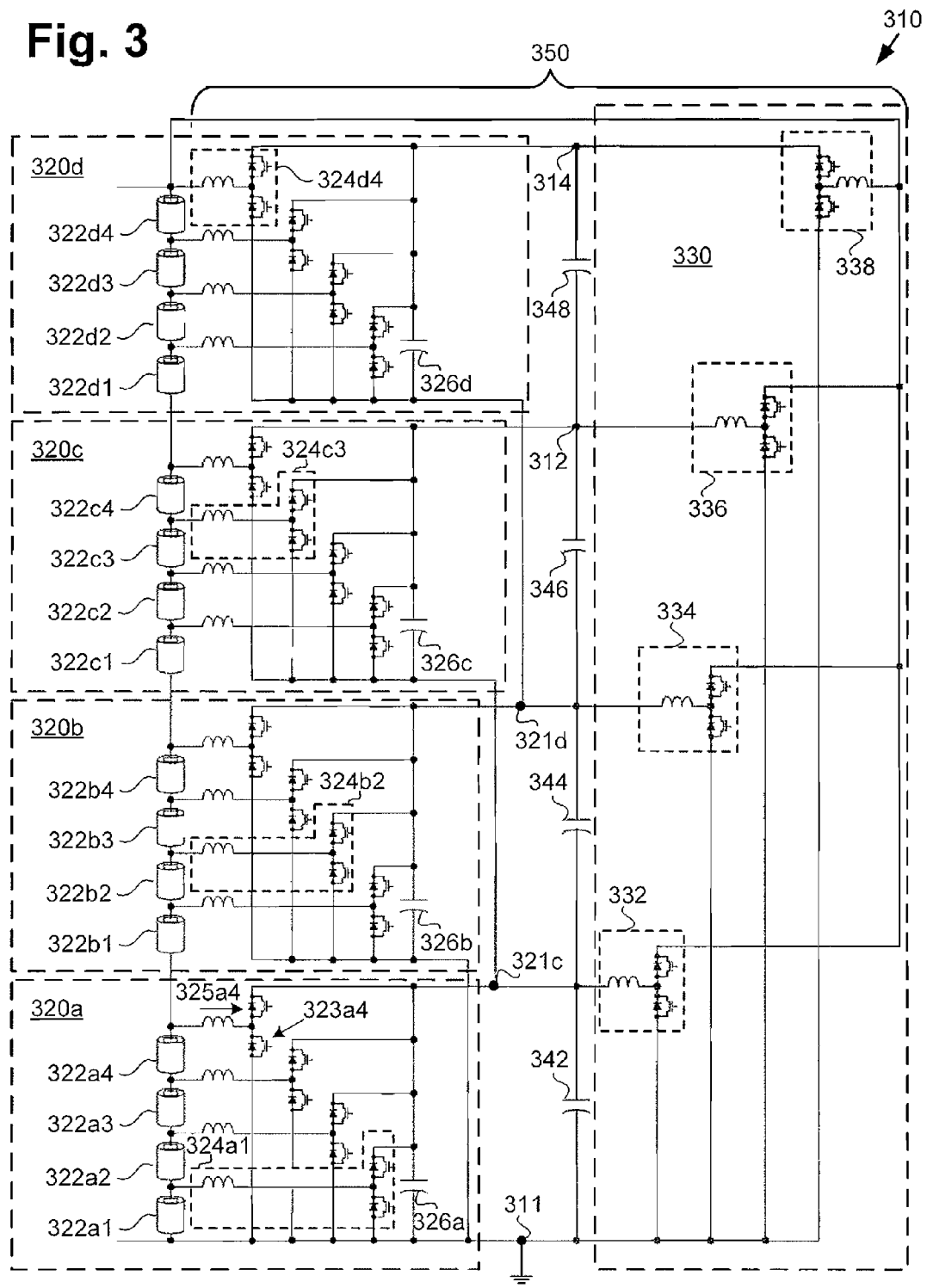
FIG. 3 is a diagram showing a more detailed representation of a system for providing active power balancing, according to one embodiment of the present invention.

Turning to FIG. 3, FIG. 3 is a diagram showing a detailed representation of portions of system 310 for providing active power balancing, according to one embodiment of the present invention, enabling cost effective balancing of large energy cell stacks using relatively low voltage circuit elements. System 310 is designed to actively balance power among numerous energy cells using relatively low voltage circuitry to provide buck/boost balancing currents to groups of cascoded energy cells, by implementing a tiered power bus topology. Thus, system 310 including active power balancing block portion 350 is analogous to system 110 including active power balancing block 150, in FIG. 1, and discloses several distinct and significant advantages for providing active power balancing for large, high voltage, energy cell stacks.

The embodiment shown in FIG. 3 is implemented to provide active balancing between power units 320a, 320b, 320c, and 320d (hereinafter "power units 320a-320d"), using energy distribution circuit 330. Each power unit of system 310 comprises a group of cascoded energy cells. As shown in FIG. 3, for example, each of power units 320a-320d comprises four cascoded energy cells. That is to say, power unit 320a includes cascoded energy cells 322a1, 322a2, 322a3, and 322a4 (hereinafter "energy cells 322a1-322a4"). Correspondingly, power units 320b, 320c, and 320d, include respective groups of energy cells 322b1-322b4, 322c1-322c4, and 322d1-322d4. Also shown in FIG. 3 is common ground node 311, system nodes 312 and 314, and reference nodes 321c and 321d each having a respective voltage offset from common ground node 311.

Applicant reiterates that the embodiments shown and specifically described in the present application are provided for conceptual clarity and are not intended to limit the present inventive concepts. For instance, system 310 may include fewer, and will typically include many more power units and/or energy cells than those shown in FIG. 3. Moreover, although each of power units 320a-320d is shown to include four energy cells each, other embodiments may implement power units having different energy cell counts. In one embodiment, system 310 may include one hundred cascoded energy cells comprised by a secondary battery pack capable of supplying more than 300V, wherein the energy cells are grouped as five power units of twenty energy cells each, ten power units of ten energy cells each, or twenty power units of five energy cells each, for example. Furthermore, as was the case for the energy cells represented in FIG. 1, energy cells 322a1-322a4, 322b1-322b4, 322c1-322c4, and 322d1-322d4, in FIG. 3, can comprise any suitable charge storage devices, such as primary batteries, secondary batteries, supercapacitors, or photovoltaic cells or panels, for example.

As further shown in FIG. 3, each power unit includes a group of buck/boost circuits for maintaining balance among the energy cells internal to the power unit. In the interests of clarity, particular buck/boost circuits are highlighted using different power units in FIG. 3. For example, although buck/boost circuit 324a1 is shown in power unit 320a, while buck/boost circuits 324b2, 324c3, and 324d4 are shown in respective power units 320b, 320c, and 320d, it is to be understood that each of power units 320a-320d includes a group of buck/boost circuits corresponding to its respective group of cascoded energy cells. Thus, power unit 320a includes buck/boost circuits 324a2, 324a3, 324a4 (not explicitly marked as such in FIG. 3) that together with identified buck/boost circuit 324a1 maintain internal power balance among cascoded energy cells 322a1-322a4. Similarly, power unit 320b includes buck/boost circuits 324b1, 324b3, 324b4 (not explicitly marked as such in FIG. 3) that together with identified buck/boost circuit 324b2 maintain internal power balance among cascoded energy cells 322b1-322b4, and so forth for power units 320c and 320d.

As shown by the present embodiment, each of the buck/boost circuits depicted in FIG. 3 comprises a high side switch, such as high side switch 325a4, and a low side switch, such as low side switch 323a4, coupled to a respective power transfer node by an input/output inductor. For example, the high side switch and low side switch may be arranged in a half bridge configuration having a switching node coupled to the respective power transfer node by the input/output inductor, as shown in FIG. 3. In addition, according to the embodiment of FIG. 3, each group of buck/boost circuits shares a capacitor common to its respective power unit. For example, the buck/boost circuits of power unit 320a all share capacitor 326a, while the buck/boost circuits comprised by power units 320b, 320c, and 320d, each share respective capacitors 326b, 326c, and 326d.

While the groups of buck/boost circuits internal to power units 320a-320d are implemented to maintain power balance among respective groups of cascoded energy cells 322a1-322a4, 322b1-322b4, 322c1-322c4, and 322d1-322d4, energy distribution circuit 330 is configured to respond to power imbalances among power units 320a-320d. According to the embodiment in FIG. 3, energy distribution circuit 330 is shown to include secondary buck/boost circuits 332, 334, 336, and 338 for transferring energy between power units 320a-320d via distribution capacitors 342, 344, 346, and 348.

As shown in FIG. 3, in one embodiment, each distribution capacitor is directly coupled to at least two power units and energy distribution circuit 330. For example, distribution capacitor 348 is coupled to power unit 320c and energy distribution circuit 330 at system node 312, and to power unit 320d and energy distribution circuit 330 at system node 314, while distribution capacitor 346 is coupled to power units 320b and 320d and energy distribution circuit 330 at reference node 321d, and to power unit 320c and energy distribution circuit 330 at system node 312.

FIG. 3 discloses one embodiment of the tiered power bus approach alluded to previously. Referring to system 310, it can be seen that distribution capacitor 342 supplies energy for balancing of energy cells 322a1-322a4 in power unit 320a, and distribution capacitors 342 and 344, together, supply energy for balancing energy cells 322b1-322b4. Analogously, the combination of distribution capacitors 344 and 346 enable balancing of energy cells 322c1-322c4, and the combination of distribution capacitors 346 and 348 enable balancing of energy cells 322d1-322d4, while energy distribution circuit 330 utilizes secondary buck/boost circuits 332, 334, 336, and 338 to transfer energy between distribution capacitors 342, 344, 346, and 348 according to the energy needs of the power units they supply.

Consequently, the voltage tolerance of the devices implemented in power units 320a-320d is determined by the voltage across any two of distribution capacitors 342, 344, 346, and 348, rather than the full bus voltage of the energy cell stack. For example, because power unit 320b is coupled between reference node 321d and common ground node 311, the maximum voltage seen by a high side switch of power unit 320b, which may be seen to correspond to high side switch 325a4 in power unit 320a, is determined by the voltage drop across distribution capacitors 342 and 344, as is also true for the low side switch of power unit 320b corresponding to low side switch 323a4 in power unit 320a.

Similarly, because power unit 320c is coupled between system node 312 and reference node 321c, which acts as the ground reference node for power unit 320c, the maximum voltage seen by the high and low side switches of power unit 320c is determined by the voltage drop across distribution capacitors 344 and 346. Similarly as well, the maximum voltage seen by the high and low side switches of power unit 320d (e.g., at the very top of the stack) is determined by the voltage drop across distribution capacitors 346 and 348. However, because power unit 320a is coupled between reference node 321c and common ground node 311, the maximum voltage seen by high side switch 325a4 and low side switch 323a4 is determined by the voltage across distribution capacitor 342 alone, which must exceed the additive voltage of cascoded energy cells 322a1-322a4 comprised by power unit 320a in order to drive current into the top of power unit 320a when necessary to balance energy cells 322a1-322a4.

Thus, the embodiment of FIG. 3, in which a tiered power bus topology is utilized, enables implementation of active power balancing system 310 using devices having a voltage tolerance of approximately half the voltage tolerance required in a common power bus implementation. Moreover, the advantageous relative reduction in voltage tolerance improves as the number of power units is increased. For example, in embodiments in which a topology similar to that shown in FIG. 3 includes six power units, the voltage tolerance required of the power unit components drops below fifty percent of the additive voltage of the power units, e.g., the full stack voltage, while when ten or more such power units are used, the required voltage tolerance can drop to less than approximately twenty-five percent of the stack voltage.

Figure 4:
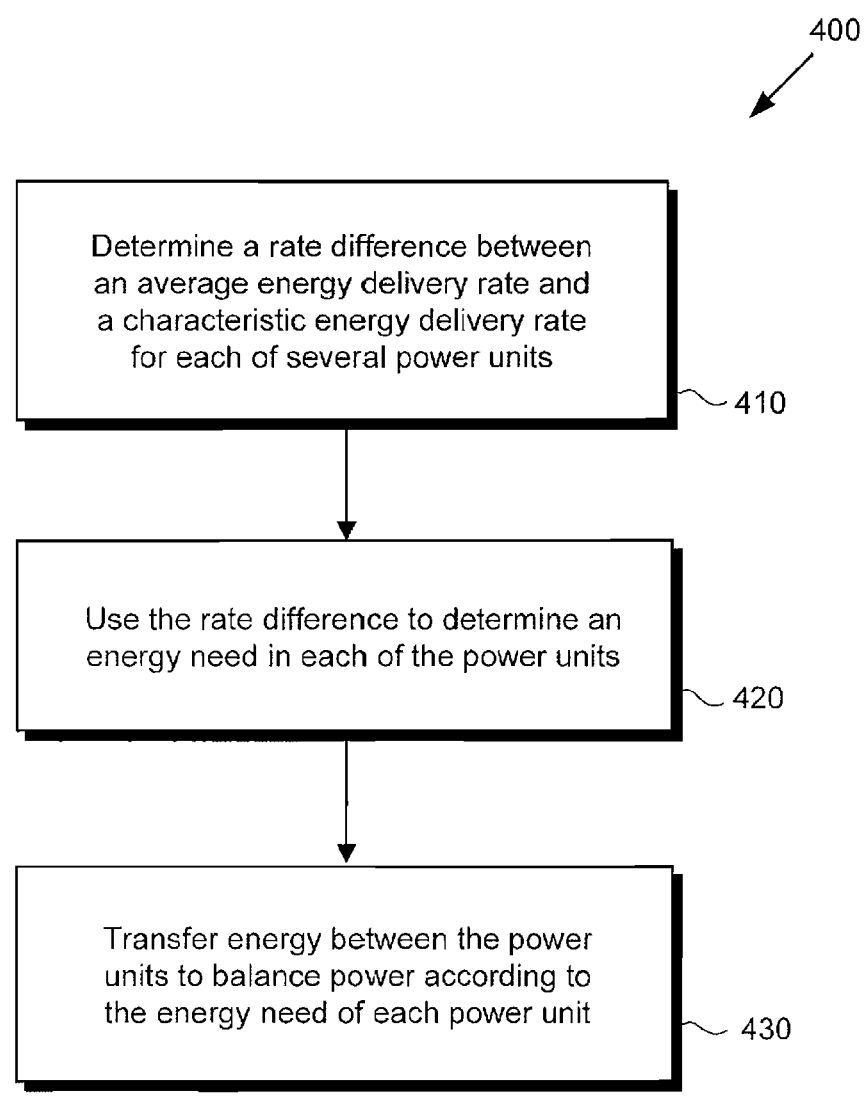
FIG. 4 shows a flowchart presenting a method for providing active power balancing, according to one embodiment of the present invention.

The operation of system 310 will now be further described in combination with FIG. 4, which shows a flowchart presenting a method for providing active power balancing, according to one embodiment of the present invention. Certain details and features have been left out of flowchart 400 that are apparent to a person of ordinary skill in the art. For example, a step may comprise one or more substeps or may involve specialized equipment or materials, as known in the art. While steps 410 through 430 indicated in flowchart 400 are sufficient to describe one embodiment of the present invention, other embodiments of the invention may utilize steps different from those shown in flowchart 400, or may comprise more, or fewer, steps.

Referring to step 410 in FIG. 4, step 410 of flowchart 400 comprises determining a rate difference between an average energy delivery rate and a characteristic energy delivery rate for each of several power units. Looking back to FIGS. 1 and 3, FIG. 3 shows that the power units may each comprise a group of cascoded energy cells, while FIG. 1 highlights the distinction between an average energy delivery rate, corresponding to the load current $I_{OUT}$ provided by energy cells 122a-122f to load 122, and the characteristic energy delivery rate shown by individualized discharge currents $I_1$, $I_2$, $I_3$, $I_4$, $I_5$, and $I_6$ of each of energy cells 122a-122f.

As may be understood by reference to FIG. 3, a characteristic energy delivery rate for each of power units 320a-320d may correspond to the average, e.g. mean, strength of the energy cells comprising each group of cascoded energy cells. Thus, the characteristic energy delivery rate for power unit 320a may correspond to the average energy cell strength of energy cells 322a1-322a4, the characteristic energy delivery rate for power unit 320b may correspond to the average energy cell strength of energy cells 322b1-322b4, the characteristic energy delivery rate for power unit 320c may correspond to the average energy cell strength of energy cells 322c1-322c4, and the characteristic energy delivery rate for power unit 320d may correspond to the average energy cell strength of energy cells 322d1-322d4, for example. Moreover, the average energy delivery rate for the power units may correspond to the output current required by a load coupled across power units 320a-320d, which, although not explicitly shown in FIG. 3, can be understood to correspond to load 102, in FIG. 1.

As previously explained, the present inventor realizes that fundamental variances across a collection of energy cells that are nominally the same will result in variances in their performance, and the same principle will apply to discrete aggregates of energy cells, such as the respective groups of cascoded energy cells comprised by power units 320a-320d. For example, although the collection of nominally identical energy cells 322a1-322a4 in power unit 320a can be characterized by average values for parameters such as charge capacity, each of energy cells 322a1-322a4 can be expected to have an individual charge capacity varying somewhat from the average. Over time, the capacity of an individual energy cell will change due to wear, and the rate of wear will vary from energy cell to energy cell due to individualized stress. Furthermore, depending on the use history, the SOC of each cell may not be uniform, such as, for example, after extended storage or after individual cell replacements. By measuring the cell voltage, current, and temperature, for example, via monitoring features within power unit 320a and power units 320b, 320c, and 320d, for example, (monitoring features not shown in FIG. 3), it is possible to determine the present state of charge and capacity of batteries 404a-404f, which can change with time.

Balance among the energy cells may then be established or simply maintained during storage, charge, discharge, and even heavy discharge of the energy cells, for example. As explained above in relation to FIG. 1, during a discharge process, the characteristic discharge rate for each of energy cells 122a-122f in that figure can be accommodated by supplementing or sinking current through power transfer nodes 124a-124f, such that discharge of each energy cell occurs at a substantially uniform SOC for all of the energy cells. A similar process can occur for each group of energy cells shown in FIG. 3, enabling determination of the rate difference between the average energy delivery rate for the stack and the characteristic energy delivery rate for each of power units 320a-320d.

Continuing with step 420 in FIG. 4, step 420 of flowchart 400 comprises using the rate difference determined in step 410 to determine an energy need in each of the power units. Referring, for example, to power unit 320a in FIG. 3, it has been explained that power unit 320a is configured to accommodate the difference between the characteristic discharge rates of adjoining energy cells 322a1 and 322a2 by utilizing buck/boost circuit 324a1 to supplying or sink the appropriate current through the power transfer node between energy cells 322a1 and 322a2. As may be seen from FIG. 3, power unit 320a can draw energy to provide supplemental current through the power transfer node from distribution capacitor 342, which as previously discussed, is configured to serve as an energy supply for power unit 320a.

It has also been previously explained that the tiered power bus topology of FIG. 3 results in distribution capacitors 342 and 344 serving as an energy supply for power unit 320b, distribution capacitors 344 and 346 serving as an energy supply for power unit 320c, and distribution capacitors 346 and 348 serving as an energy supply for power unit 320d. Thus depending on the aggregate strength of the energy cells comprised by each of power units 320a-320d, as reflected for example by their respective rate differences, more or less energy will be withdrawn from each of distribution capacitors 342, 344, 346, and 348 for power balancing by power units 320a-320d, enabling a determination of the energy need of each power unit corresponding to the rate difference.

Moving to step 430 in FIG. 4, step 430 of flowchart 400 comprises transferring energy between the power units to balance power according to the energy need of each power unit. Referring once again to FIG. 3, step 430 may be performed by system 310 using energy distribution circuit 330. That is to say, secondary buck/boost circuits 332, 334, 336, and 338 can be selectively activated to transfer energy among distribution capacitors 342, 344, 346, and 348 to accommodate the differing energy needs of power units 320a-320d, as each individually attends to balancing its constituent group of cascoded energy cells. Although the topology shown in FIG.

3 requires that the circuit elements implemented in secondary buck/boost circuits 332, 334, 336, and 338 be fabricated so as to tolerate the full stack voltage provided by power units 320a-320d, that embodiment advantageously enables use of smaller, faster, and less robust circuit elements in power units 320a-320d due to the tiered power bus design supplying energy to those power units.

Figure 5:
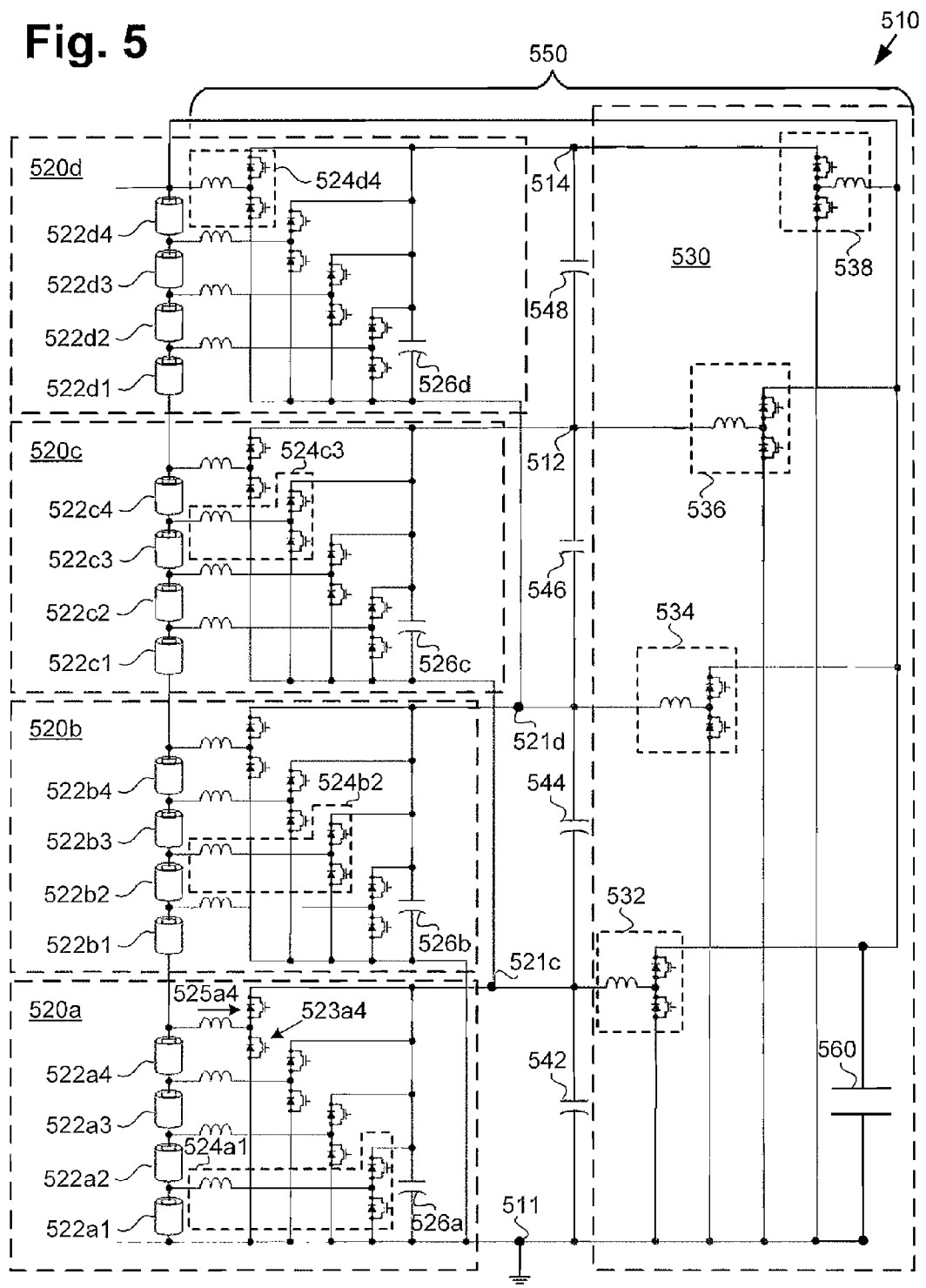
FIG. 5 is a diagram showing a system for providing active power balancing, according to another embodiment of the present invention.

Proceeding now to FIG. 5, FIG. 5 is a diagram showing a system for providing active power balancing, according to another embodiment of the present invention. System 510 including power units 520a, 520b, 520c, and 520d (hereinafter "power units 520a-520d") and energy distribution circuit 530 corresponds to system 310 including power units 320a-320d and energy distribution circuit 330, in FIG. 3. Like the embodiment of FIG. 3, system 510, in FIG. 5 is implemented using a tiered power bus design enabling cost effective balancing of large energy cell stacks using relatively low voltage circuit elements in power units 520a-520d. It is noted that all features shown by FIG. 5 to have reference numbers corresponding to the reference numbers appearing in FIG. 3 correspond respectively to those features and provide the advantages previously described by reference to system 310.

In addition, system 510, in FIG. 5, includes system storage capacitor 560. As shown in FIG. 5, system storage capacitor 560 is coupled across the stack formed by power units 520a-520d from common ground node 511. According to the embodiment of FIG. 5, system supply capacitor 560 may act as an energy reservoir supporting the transfer of energy to and among distribution capacitors 542, 544, 546, and 548 by energy distribution circuit 530. Thus, unlike system 310, in FIG. 1, in which energy for distribution among power units 320a-320d is drawn directly from the top of the energy cell stack, system 510, in FIG. 5, implements system storage capacitor 560, which may be pre-charged, for example, to mediate the distribution of energy among the power units.

Thus, in a wide variety of possible implementations, embodiments of the present invention enable active power balancing through the redistribution of energy among energy cells and among power units including groups of energy cells during an energy discharge or an energy accumulation process. Because energy is substantially conserved in the active power balancing approach disclosed herein, embodiments of the present invention enable energy transfer among energy cells and power units at a substantially uniform SOC for substantially all energy cells without requiring additional energy inputs from one or more external power sources. Moreover, by utilizing the tiered power bus topology disclosed herein, a system for providing active power balancing can be implemented using smaller, faster, and less voltage tolerant devices than has heretofore been possible.

From the above description of the invention it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. The described embodiments are to be considered in all respects as illustrative and not restrictive. It should also be understood that the invention is not limited to the particular embodiments described herein, but is capable of many rearrangements, modifications, and substitutions without departing from the scope of the invention.

The invention claimed is:

1. A system for actively balancing power between several power units, each of said several power units comprising a corresponding group of cascaded energy cells and a power unit capacitor, said system comprising:
a group of buck/boost circuits used in each of said several power units, each buck/boost circuit configured as a buck and boost circuit for maintaining an internal power balance among said corresponding group of cascaded energy cells;
an energy distribution circuit for responding to a respective energy need in each of said several power units, said energy distribution circuit including a plurality of secondary circuits configured to transfer energy among said several power units, each of said plurality of secondary circuits being directly coupled to a common ground node;
said power unit capacitor of one of said several power units being coupled in parallel with a corresponding distribution capacitor of said one of said several power units between an output of one of said plurality of secondary circuits and said common ground node;
said energy distribution circuit configured to transfer energy between said several power units to balance power among said several power units according to said respective energy need.

2. The system of claim 1, wherein a first and a second group of buck/boost circuits used in respective first and second power units of said system share a common ground node, and wherein a third group of buck/boost circuits used in a respective third power unit are coupled to a ground reference node having a voltage offset from said common ground node.

3. The system of claim 2, wherein said voltage offset is greater than an additive voltage of said corresponding group of cascaded energy cells in said first power unit.

4. The system of claim 1, further comprising several distribution capacitors including said corresponding distribution capacitor of said one of said several power units, said several. distribution capacitors corresponding respectively to said several power units, each of said several distribution capacitors coupled to at least two of said several power units and to said energy distribution circuit.

5. The system of claim 1, further comprising a system storage capacitor coupled across said several power units.

6. The system of claim 1, wherein actively balancing power between said several power units results in energy transfer occurring at a substantially uniform state of charge (SOC) for each energy cell of each said corresponding group of cascaded energy cells.

7. The system of claim 1, wherein said several power units form a secondary battery pack capable of supplying greater than approximately three hundred volts (300 V).

8. The system of claim 1, wherein each of said buck/boost circuits comprises a high side switch and a low side switch, and wherein a breakdown voltage of said high and low side switches is less than approximately fifty percent (50%) of an additive voltage of said several power units.

9. The system of claim 1, wherein each of said buck/boost circuits comprises a high side switch and a low side switch, and wherein a breakdown voltage of said high and low side switches is less than approximately twenty-five percent (25%) of an additive voltage of said several power units.

10. A method for actively balancing power between several power units each including a power unit capacitor, said method comprising:
maintaining an internal power balance among a group of cascaded energy cells within each of said several power units;
transferring energy between each of said several power units to balance power between said several power units using an energy distribution circuit including a plurality of secondary circuits configured to perform said transferring, each of said plurality of secondary circuits being directly coupled to a common ground node;

wherein said power unit capacitor of one of said several power units is coupled in parallel with a corresponding distribution capacitor of said one of said several power units between an output of one of said plurality of secondary circuits and said common ground node.

11. The method of claim 10, wherein actively balancing power between said several power units results in energy transfer occurring at a substantially uniform state of charge (SOC) for each cascaded energy cell in each of said several power units.

12. The method of claim 10, wherein said several power units form a secondary battery pack capable of supplying greater than approximately three hundred volts (300 V).

13. The method of claim 10, wherein said maintaining said internal power balance among said group of cascaded energy cells within each of said several power units is performed by a corresponding group of buck/boost circuits used in each of said several power units, each buck/boost circuit configured as a buck and boost circuit.

14. The method of claim 13, wherein a first and a second group of buck/boost circuits used in respective first and second power units share a common ground node, and a third group of buck/boost circuits used in a respective third power unit are coupled to a ground reference node having a voltage offset from said common ground node, each buck/boost circuit configured as a buck and boost circuit.

15. A method for actively balancing power between several power units, each of said several power units comprising a corresponding group of cascaded energy cells, said method comprising:

determining, for each of said several power units, a rate difference between a characteristic energy delivery rate for said corresponding group of cascaded energy cells and an average energy delivery rate for said several power units;

utilizing said rate difference to determine a respective energy need in each of said several power units;

transferring energy between said several power units to balance power among said several power units according to said respective energy need.

16. The method of claim 15, wherein actively balancing power between said several power units results in energy transfer occurring at a substantially uniform state of charge (SOC) for each cascaded energy cell in each of said several power units.

17. The method of claim 15, wherein said several power units form a secondary battery pack capable of supplying greater than approximately three hundred volts (300 V).

18. The method of claim 15, wherein said transferring energy between said several power units to balance power among said several power units comprises transferring energy between several distribution capacitors corresponding respectively to said several power units.

19. The method of claim 18, wherein each of said several distribution capacitors is coupled to at least two of said several power units and to an energy distribution circuit.

* * * * *